Nov. 20, 1962 C. R. SCHAFER 3,064,478
SERVO ALTIMETER SYSTEM
Filed Aug. 26, 1959 2 Sheets-Sheet 1
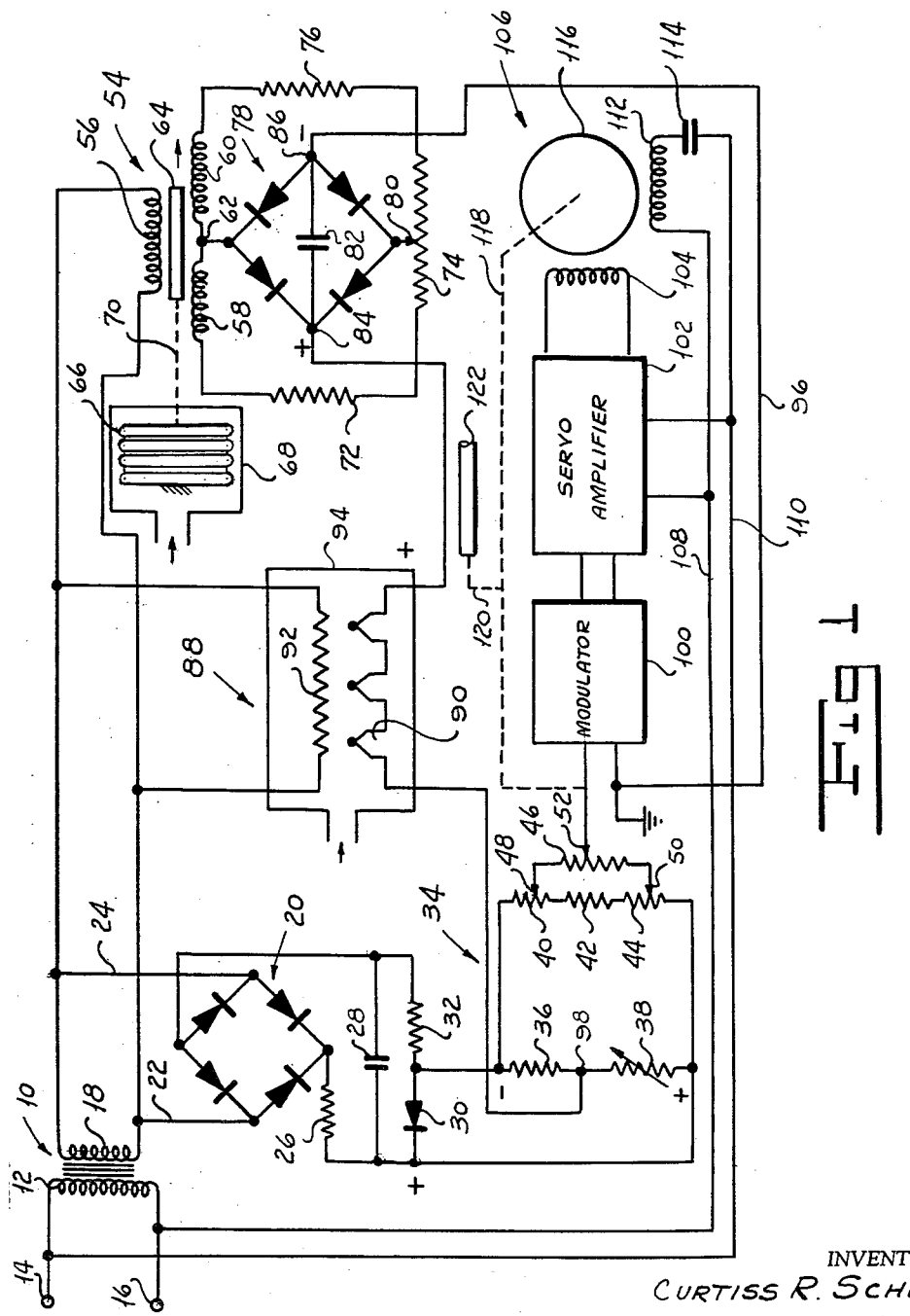
INVENTOR.
CURTISS R. SCHAFER
BY Henry L. Shenier
ATTORNEY

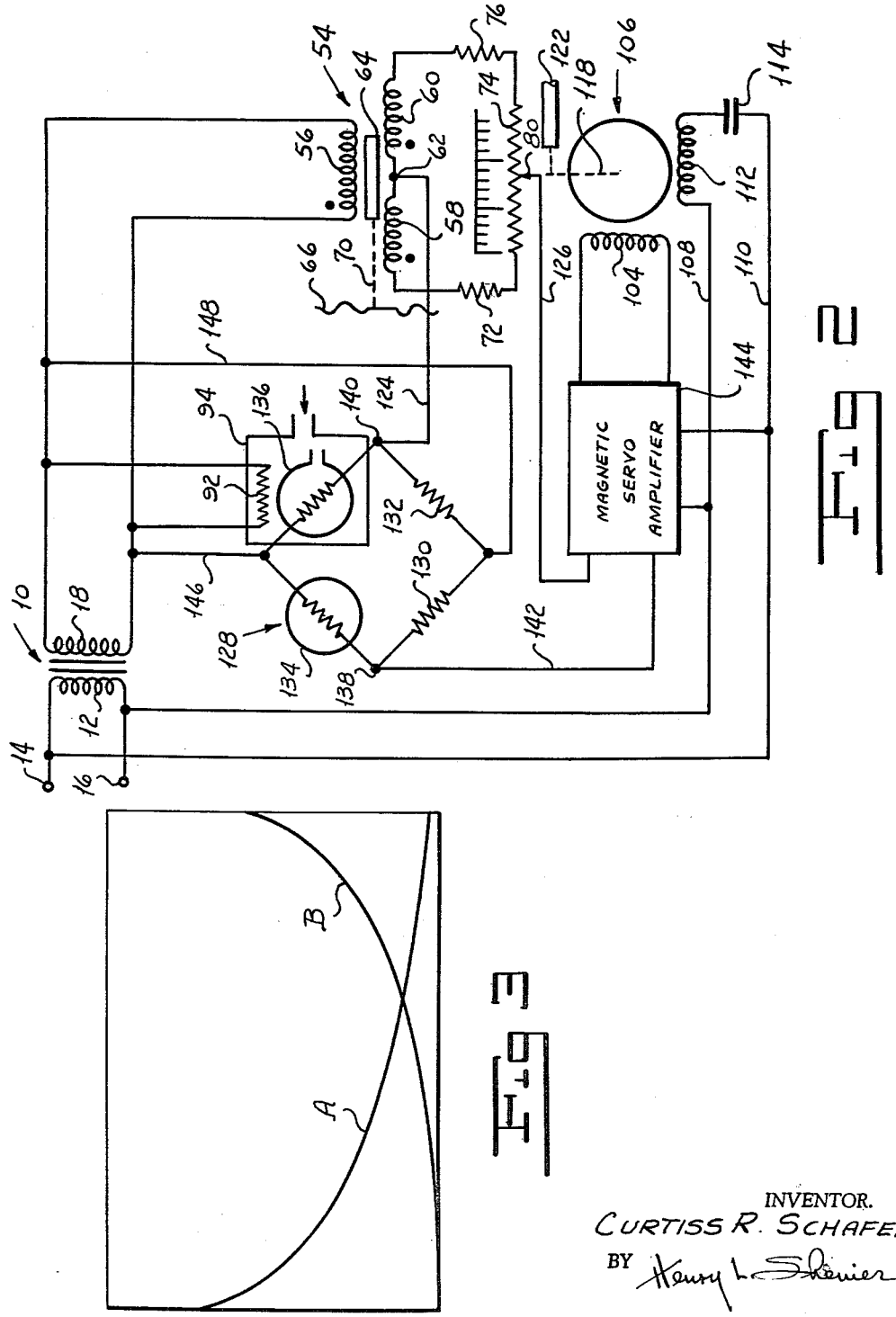

United States Patent Office 3,064,478
Patented Nov. 20, 1962

3,064,478
SERVO ALTIMETER SYSTEM
Curtiss R. Schafer, Newtown, Conn., assignor to United Aircraft Corporation, East Hartford, Conn., a corporation of Delaware
Filed Aug. 26, 1959, Ser. No. 836,279
9 Claims. (Cl. 73—384)

My invention relates to a servo altimeter system and more particularly to an improved altimeter system which is accurate over a very wide altitude range.

For the control of aircraft and missiles which fly at extremely high altitudes, it is necessary that an altimeter be provided which is extremely accurate over a very wide altitude range. For example, such altimeters should have a substantially constant accuracy over the range of altitudes from below sea level to an altitude in excess of two hundred thousand feet. Aneroid altimeters of the prior art which depend for their operation on the mechanical displacement of a diaphragm or bellows begin to lose their sensitivity and accuracy at an altitude of around fifty thousand feet. Above an altitude of about seventy-five thousand feet, these aneroid altimeters are entirely impractical. There are known in the prior art devices which depend upon thermal conductivity of gases for measuring very low pressures. Such devices embodied in altimeters are operable over a range of altitudes from about fifty thousand feet up to approximately two hundred and fifty thousand feet. These altimeters are not satisfactory at altitudes below fifty thousand feet since they inherently lose sensitivity at the relatively higher pressures existing at lower altitudes. Moreover, their accuracy is impaired by the presence of water vapor at these altitudes.

I have invented an improved servo altimeter system which takes advantage of the desirable characteristics of both the aneroid altimeters and the thermal conductivity altimeters known in the prior art. My altimeter is operable over a wide range of altitudes. It has a substantially constant accuracy over its range. My altimeter system is sensitive both to the relatively high pressures existing at low altitudes and to the relatively low pressures existing at high altitudes. I arrange my altimeter to produce an output torque of sufficient magnitude to drive control elements associated with air data computers, automatic pilots and fire control systems. The accuracy of my system is not affected by the presence of water vapor in the atmosphere.

One object of my invention is to provide a servo altimeter system which embodies the desirable characteristics of both an aneroid pressure-responsive device and a thermal conductivity pressure-responsive device.

Another object of my invention is to provide a servo altimeter system which is sensitive over an extremely wide range of altitudes.

A further object of my invention is to provide a servo altimeter system having a substantially constant accuracy over its range of operation.

Still another object of my invention is to provide a servo altimeter system which provides an output torque having a magnitude sufficient to drive a number of control elements in other instruments and systems.

A still further object of my invention is to provide a servo altimeter system, the accuracy of which is not affected by the presence of water vapor in the atmosphere.

Other and further objects of my invention will appear from the following description.

In general my invention contemplates the provision of a servo altimeter system including an aneroid pressure-responsive device for producing an output signal proportional to the pressure applied to the device over a given range and a thermal conductivity pressure-responsive device for producing a second electrical signal proportional to pressure over a range of pressures extending beyond the range over which the aneroid device is operative. I combine the electrical signals produced by the aneroid and thermal conductivity devices in such a manner as to produce an electrical signal which is a measure of altitude over an extremely wide range. My system includes a servo motor responsive to the combined signal for producing an output shaft displacement which is a measure of altitude over an extremely wide range of altitude.

In the accompanying drawings which form part of the instant specification and which are to be read in conjunction therewith and in which like reference numerals are used to indicate like parts in the various views:

FIGURE 1 is a schematic view of one form of my servo altimeter system.

FIGURE 2 is a schematic view of a second form of my servo altimeter system.

FIGURE 3 is a graph illustrating the respective sensitivity characteristics of an aneroid pressure-responsive device and a thermal conductivity pressure-responsive device.

Referring now more particularly to FIGURE 1 of the drawings, one form of my system includes a transformer indicated generally by the reference character 10 having a primary winding 12 connected to the terminals 14 and 16 of a suitable source of alternating current potential. Transformer 10 includes a secondary winding 18 which supplies a full wave rectifier indicated generally by the reference character 20 through conductors 22 and 24. I connect a resistor 26 and a smoothing capacitor 28 in series across the output terminals of the rectifier 20. I connect a Zener diode 30 and a resistor 32 in series across the capacitor 28 in such a manner that the diode 30 is reverse biased to provide an accurate reference voltage for this form of my system.

I apply the reference potential existing across diode 30 to the reference network indicated generally by the reference character 34 of the system. Network 34 includes a resistor 36 in series with a variable resistor 38, the function of which will be explained hereinafter. I connect the resistors 36 and 38 in parallel with series connected resistors 40, 42, and 44. A resistor 46 connects respective brushes 48 and 50 associated with the resistors 40 and 44. A brush 52 associated with resistor 46 may be moved along the resistor to bring the system to balance in a manner to be described hereinafter.

The aneroid pressure-responsive section of my system includes a transformer, indicated generally by the reference character 54, having a primary winding 56 connected across the winding 18 and a secondary winding divided into sections 58 and 60 by a center tap 62. Transformer 54 includes a shiftable magnetic core 64 adapted to be moved to vary the coupling between the primary winding 56 and the respective secondary winding sections 58 and 60. I mount an evacuated bellows 66 within a housing 68 into which the atmosphere is admitted to expose the bellows to the pressure of the atmosphere. A suitable mechanical linkage 70 connects the bellows 66 to the core 64 to shift the core in response to changes in pressure. I connect resistors 72, 74, and 76 in series across the secondary winding including sections 58 and 60. I connect a full wave rectifier indicated generally by the reference character 78 between the center tap 62 and a brush 80 associated with resistor 74. A capacitor 82 connected across the output terminals 84 and 86 smooths the output voltage of the rectifier.

From the structure just described, it will be seen that with the core 64 disposed at an initial position corresponding to the lowest altitude with a predetermined coupling between winding 56 and winding section 58 and between winding 56 and section 60 and with the brush 80 in an initial position at which it divides the potential on resistor 74 in the same ratio as the potentials in winding sections 58 and 60, bridge 78 produces no output signal at its terminals 84 and 86. When the core 64 is displaced from its zero position, the relative coupling between the winding 56 and the windings 58 and 60 changes with the result that bridge 78 produces an output signal of the polarity shown at the terminals 84 and 86. The brush 80 provides a means by which the zero point of this system can be adjusted. The bellows 66 is sensitive to pressures below approximately fifty thousand feet and begins to lose its sensitivity at pressures above this altitude. In FIGURE 3 the curve A illustrates the sensitivity of this mechanical pressure-responsive system.

I provide my system with a pressure-responsive device indicated generally by the reference character 88 which operates on the thermal conductivity principle. As is known in the art, at high altitudes where the mean free path of particles is relatively large the thermal conductivity or the amount of heat transferred per unit area is directly proportional to pressure. The device 88 embodies this principle to provide an electrical signal which is proportional to altitude over the higher range of altitudes from for example fifty thousand to two hundred and fifty thousand feet. The device 88 includes thermopile 90, made up of many noble-metal, butt-welded thermocouples. These thermocouples are exceptionally rugged and stable, are not damaged by continuous exposure to atmospheric pressure and moisture, and are self-compensating for changes in ambient temperature.

I enclose the thermopile 90 together with a resistance heating element 92, connected across winding 18, within a housing 94 which is open to the atomsphere to expose the thermopile to the ambient pressure. As will be apparent from the explanation given hereinabove, with the hot junctions of the elements making up the thermopile 90 heated to a relatively high temperature by the heater 92, the thermopile 90 produces a relatively large output signal of the polarity indicated in FIGURE 1. At relatively high pressures existing at low altitudes the thermal conductivity of the atmosphere is independent of pressure with the result that the output voltage of the thermopile 90 is substantially constant. At the low pressures existing at high altitudes, the thermal conductivity of the atmosphere is directly proportional to pressure with the result that the output voltage from the thermopile changes in proportion to changes in pressure. Thus, the device 88 is relatively insensitive at low altitudes and its sensitivity increases at high altitudes. I have illustrated the sensitivity characteristic of the device 88 schematically by the curve B in FIGURE 3.

I connect the output terminals 84 and 86 of the device 54 in series with the thermopile 90 between a conductor 96 connected to ground and the common terminal 98 of resistors 36 and 38. As will be apparent from the polarities shown in FIGURE 1, at relatively low altitudes the thermopile 90 provides the major portion of the signal applied to terminal 98. Over the range of lower altitudes as the aircraft or the like carrying the altimeter rises, the output signal from the aneroid device 54 gradually reduces the magnitude of the signal applied to the terminal 98 to cause this terminal to become less and less negative. This operation continues until the bellows 66 begins to lose its sensitivity. As the aircraft rises in the relatively high altitudes, the magnitude of the output of the device 88 becomes smaller and smaller with the result that terminal 98 is less and less negative. In this manner the potential at terminal 98 rises smoothly from a negative value toward ground as the aircraft or the like carrying my system rises.

With the arrangement shown some point on the resistor 46 is at a potential corresponding to ground potential. Assuming, for example, that a potential of one hundred volts is applied to the network 34 and that resistors 36 and 38 have equal values each resistor carries a potential of fifty volts and point 98 is at ground. With brush 52 moved to a point on resistor 46 corresponding to ground potential, no potential exists between the brush and ground conductor 96. If, however, a negative potential is applied to point 98, brush 52 must be moved downwardly to the new location of the point on resistor 46 corresponding to ground. It will be seen that from an initially negative potential applied to point 98 that if this potential rises brush 52 must be moved upwardly along resistor 46 to the point of balance. Brush 48 provides a means for adjusting the high altitude point while brush 50 provides a means for adjusting the low altitude point. The variable resistor 38 may be actuated to provide the correct cold junction compensation for the thermopile 90.

I connect the input terminals of modulator 100 between brush 52 and ground conductor 96. The modulator 100 may be of any suitable type known to the art such, for example, as a mechanical chopper or transistor modulator. I apply the output of modulator 100 to a servo amplifier 102 which may be any suitable type of magnetic or electronic amplifier known to the art. I apply the output of the amplifier 102 to the control phase winding 104 of a servo motor indicated generally by the reference character 106. Respective conductors 108 and 110 supply the voltage at terminals 14 and 16 to the servo amplifier 102 and to the main phase 112 of motor 106 through a phasing capacitor 114. In response to a potential on the brush 52 when the system is unbalanced, a signal is produced in winding 104 which causes the armature 116 of motor 106 to drive its output shaft 118. Shaft 118 drives the brush 52 through a suitable mechanical linkage to a position of balance. Another linkage 120 driven by shaft 118 drives a shaft 122 which may drive the control elements and an indicator (not shown) associated with the system.

Referring now to FIGURE 2 an alternate form of my servo altimeter includes the transformer 10, the secondary winding 18 of which supplies the primary winding 56 of transformer 54 having secondary winding sections 58 and 60 and a movable core 64 driven by bellows 66 through a linkage 70. As in the form of my invention shown in FIGURE 1, I contact resistors 72, 74, and 76 in series across the secondary winding sections 58 and 60. Considering the network including resistors 72, 74, and 76 per se with the brush 80 at a position on resistor 74 corresponding to the potential of point 62 clearly no potential difference exists between a conductor 124 connected to tap 62 and a conductor 126 connected to brush 80. Initially armature or core 64 may be moved to any desired starting position.

The form of my invention shown in FIGURE 2 includes a bridge indicated generally by the reference character 128 having resistance arms 130 and 132 and a pair of thermistors 134 and 136 forming the other resistance arms of the bridge. I enclose the thermistor 134 in a vacuum to provide a pressure reference and to compensate for changes in ambient temperature. I dispose the other thermistor 136 in the housing 94 and subject it to the action of the heater 92. From its initial high temperature at which it has a relatively low resistance, the resistance of thermistor 136 increases at higher altitudes at which the thermal conductivity of the atmosphere is directly proportional to pressure. I connect the signal appearing at the output terminals 138 and 140 of the bridge 128 in series with the signal appearing between the tap 62 and the brush 80 by means of conductor 124. Conductor 126 and a conductor 142 apply these signals to the input terminals of servo amplifier 144 which supplies a signal for the control phase winding 104 of motor 106. Conductors 108 and 110 supply the signals at terminals 14 and 16 to the amplifier 144 and to the main phase winding 112 through the phasing capacitor 114. It is to be understood, of course, that conductors 146 and 148 apply the potential on secondary winding 18 to the input terminals of the bridge 128. In the form of my invention shown in FIGURE 2 shaft 118 of motor 106 drives brush 80 and the shaft 122.

In operation of the form of my invention shown in FIGURE 1, at the initial altitude heater 92 has its full effect on the hot junctions of the thermopile 90 with the result that the thermopile produces its maximum output voltage. At this point the core 64 is in its zero position from which it is adapted to be displaced to the right under the action of bellows 66. Brush 80 is at a position on resistor 74 at which bridge 78 produces no output signal. As the aircraft or the like carrying my system rises at relatively low altitudes, bellows 66 expands to cause bridge 78 to produce an output potential of the polarity indicated in FIGURE 1. As this potential increases, the potential of point 98 becomes less and less negative. As a result brush 52 carries an output signal which is modulated by modulator 100, amplified by amplifier 102 and applied to the control winding 104 of motor 106. As a result motor 106 drives brush 52 to a point of balance on resistor 46. Under the action of motor 106 sufficient torque is applied to the shaft 122 to drive the control device (not shown) associated with the system.

When an altitude is reached at which the aneroid system loses its sensitivity, the sensitivity of the thermal conductivity device 88 increases. The thermal conductivity of the atmosphere admitted to housing 94 decreases with decreasing pressure as the altitude increases at higher altitudes with the result that the temperature of the hot junction of the thermopile drops and the magnitude of the output signal of the device 88 is reduced. Consequently, the potential applied to point 98 becomes less negative and brush 52 must be moved further up on resistor 46 to bring the system to balance. The result of this operation is a smooth measurement of altitude from over a very wide range of altitudes. It will be appreciated that I so combine the electrical signal produced by the aneroid device with the signal produced by the thermal conductivity device that substantially no current passes through the thermal conductivity device at the null or balance point of the system.

In operation of the form of my invention shown in FIGURE 2, core 64 is initially in a position from which it is to be displaced as altitude increases and brush 80 is at a point on resistor 74 where it divides the voltage on the resistor in the same proportion as the proportion of the voltages in winding sections 58 and 60. At this time thermistor 136 feels the full effect of heater 92 and the resistance values of the arms of the bridge are such that the bridge produces substantially no output signal. As the craft carrying my system rises, armature 64 moves to the right, as viewed in FIGURE 2, to produce a signal between tap 62 and brush 80 to energize motor 106 through amplier 144 to drive brush 80 to a point of balance. At higher altitudes at which the device 54 loses its sensitivity, the thermal conductivity of the atmosphere to which thermistor 136 is subjected varies directly with pressure with the result that the bridge produces an output signal which adds to the signal produced by the device 54 as the aircraft rises to cause brush 80 to be driven toward the point of higher altitude on resistor 74.

It will be seen that I have accomplished the objects of my invention. I have provided a servo altimeter system which is sensitive over very wide ranges of altitude. My system is not affected by the presence of moisture in the atmosphere. My system is extremely accurate over the range of its operation. The output torque produced by my system is sufficient to drive the associated control devices.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An altimeter for producing a precise indication of altitude over a wide range of altitudes including in combination an aneroid device for producing a mechanical displacement in response to changes in pressure, said aneroid device having a sensitivity which decreases with altitude from an initially high sensitivity at a low altitude, means responsive to the operation of said aneroid device for producing a first electrical signal, a thermal conductivity device for producing a second electrical signal in response to changes in pressure, said thermal conductivity device having a sensitivity which increases with increasing altitude from a relatively low sensitivity at a low altitude and means for adding said electrical signals to produce a resultant electrical signal which is a measure of altitude over a wide range of altitudes.

2. An altimeter for producing a precise indication of altitude over a wide range of altitudes including in combination an aneroid device for producing a mechanical displacement in response to changes in pressure, said aneroid device having a sensitivity which decreases with altitude from an initially high sensitivity at a low altitude, means responsive to the operation of said aneroid device for producing a first electrical signal, a thermopile for producing a second electrical signal, a heater for said thermopile, the arrangement being such that said second electrical signal varies in response to changes in pressure, said thermopile having a sensitivity which increases with increasing altitude from a low initial sensitivity at a low altitude and means for adding said first and second electrical signals to produce a resultant electrical signal which is a measure of altitude over a wide range of altitudes.

3. An altimeter for producing a precise indication of altitude over a wide range of altitudes including in combination an aneroid device for producing a mechanical displacement in response to changes in pressure, said aneroid device having a sensitivity which decreases with altitude from an initially high sensitivity at a low altitude, means responsive to the operation of said aneroid device for producing a first electrical signal, means including a thermistor and a heater for said thermistor for producing a second electrical signal in response to changes in pressure, said thermistor having a sensitivity which increases with increasing altitude from a low initial sensitivity at a low altitude and means for adding said first and second electrical signals to produce a resultant electrical signal which is a measure of altitude over a wide range of altitudes.

4. An altimeter for producing a precise indication of altitude over a wide range of altitudes including in combination an aneroid device for producing a mechanical displacement in response to changes in pressure, said aneroid device having a sensitivity which decreases with altitude from an initially high sensitivity at a low altitude, means responsive to the operation of said aneroid device for producing a first electrical signal, means including an electrical bridge comprising a pair of arms including respective thermistors and a heater for one of said thermistors for producing a second electrical signal in response to changes in pressure, said bridge means having a sensitivity which increases with increasing altitude from a low initial sensitivity at a low altitude and means for adding said electrical signals to produce a resultant electrical signal which is a measure of altitude over a wide range of altitudes.

5. An altimeter for producing a precise indication of altitude over a wide range of altitudes including in combination an aneroid device for producing a mechanical displacement in response to changes in pressure, said aneroid device having a sensitivity which decreases with altitude from an initially high sensitivity at a low altitude, a transformer comprising a primary winding and a secondary winding provided with a center tap dividing said secondary winding into sections and a movable core, a source of electrical signal, means for applying said signal to said primary winding, a linkage connecting said aneroid device to said core to cause said secondary winding sections to carry respective voltages the relative magnitudes of which afford a measure of the amount of displacement of said aneroid device, means responsive to said secondary winding section voltages for producing a first electrical signal, a thermal conductivity device for producing a second electrical signal in response to changes in pressure, said thermal conductivity device having a sensitivity which increases with increasing altitude from a relatively low sensitivity at a low altitude and means for adding said electrical signals to produce a resultant electrical signal which is a measure of altitude over a wide range of altitudes.

6. An altimeter including in combination an aneroid device for producing a mechanical displacement in response to changes in pressure at relatively low altitudes, means responsive to the operation of said aneroid device for producing a first electrical signal, a thermal conductivity device for producing a second electrical signal in response to changes in pressure at relatively high altitudes, a source of reference voltage, a floating bridge having a pair of reference voltage input terminals and a third input terminal and a shiftable balancing terminal, means for applying said reference voltage to said reference voltage input terminals, means for applying said first and second electrical signals to said third input terminal to cause said bridge to produce an output signal and means responsive to said bridge output signal for moving said balancing terminal to a point of balance whereby the position of said balancing terminal is a measure of altitude.

7. A servo altimeter for producing a precise indication of altitude over a wide range of altitudes including in combination an aneroid device for producing a mechanical displacement in response to changes in pressure, said aneroid device having a sensitivity which decreases with altitude from an initially high sensitivity at a low altitude, means responsive to the operation of said aneroid device for producing a first electrical signal, a thermal conductivity device for producing a second electrical signal in response to changes in pressure, said thermal conductivity device having a sensitivity which increases with increasing altitude from a relatively low sensitivity at a low altitude, means for adding said first and second electrical signals to produce a resultant signal, means for producing a signal which is a measure of altitude for balancing said resultant signal and means responsive to said resultant signal for actuating said balancing signal producing means to produce a potential which balances said resultant potential whereby said balancing signal affords a measure of altitude.

8. A servo altimeter for producing a precise indication of altitude over a wide range of altitudes including in combination an aneroid device for producing a mechanical displacement in response to changes in pressure, said aneroid device having a sensitivity which decreases with altitude from an initially high sensitivity at a low altitude, means responsive to the operation of said aneroid device for producing a first electrical signal, a thermal conductivity device for producing a second electrical signal in response to changes in pressure, said thermal conductivity device having a sensitivity which increases with increasing altitude from a relatively low sensitivity at a low altitude, a source of variable balancing voltage, a pair of error terminals, means connecting said first signal producing means and said second signal producing means and said balancing voltage producing means in series between said error voltage terminals to produce an error voltage at said terminals when said balancing voltage differs from the sum of said first and second signals and means responsive to said error voltage for varying said balancing voltage to reduce said error voltage to zero, said balancing voltage being equal to the sum of said first and second pressure responsive signals when said error voltage is zero whereby said balancing voltage affords a measure of altitude.

9. A servo altimeter for producing a precise indication of altitude over a wide range of altitudes including in combination an aneroid device for producing a mechanical displacement in response to changes in pressure, said aneroid device having a sensitivity which decreases with altitude from an initially high sensitivity at a low altitude, means responsive to the operation of said aneroid device for producing a first voltage, a thermal conductivity device for producing a second voltage in response to changes in pressure, said thermal conductivity device having a sensitivity which increases with increasing altitude from a relatively low sensitivity at a low altitude, a source of variable balancing voltage, means for summing said first voltage and said balancing voltage to provide a resultant voltage, a pair of error voltage terminals, means connecting said summing means and said second voltage producing means in series between said error voltage terminals to produce an error voltage between said terminals when the sum of said first and second voltage differs from said balancing voltage and means responsive to said error voltage for varying said balancing voltage, said balancing voltage being equal to the sum of said first and second pressure responsive signals when said error signal is zero to reduce said error signal to zero whereby said balancing voltage affords a measure of altitude.

References Cited in the file of this patent

UNITED STATES PATENTS

| | | |
|---|---|---|
| 2,315,671 | Tawney | Apr. 6, 1943 |
| 2,460,873 | Clewell et al. | Feb. 8, 1949 |
| 2,718,144 | Hornfeck | Sept. 20, 1955 |
| 2,885,611 | Macgeorge | May 5, 1959 |
| 2,921,279 | Cosby et al. | Jan. 12, 1960 |
| 2,930,035 | Altekruse | Mar. 22, 1960 |

FOREIGN PATENTS

| | | |
|---|---|---|
| 778,462 | Great Britain | July 10, 1957 |